(No Model.)
C. A. RAHN.
HARNESS.
No. 532,906. Patented Jan. 22, 1895.
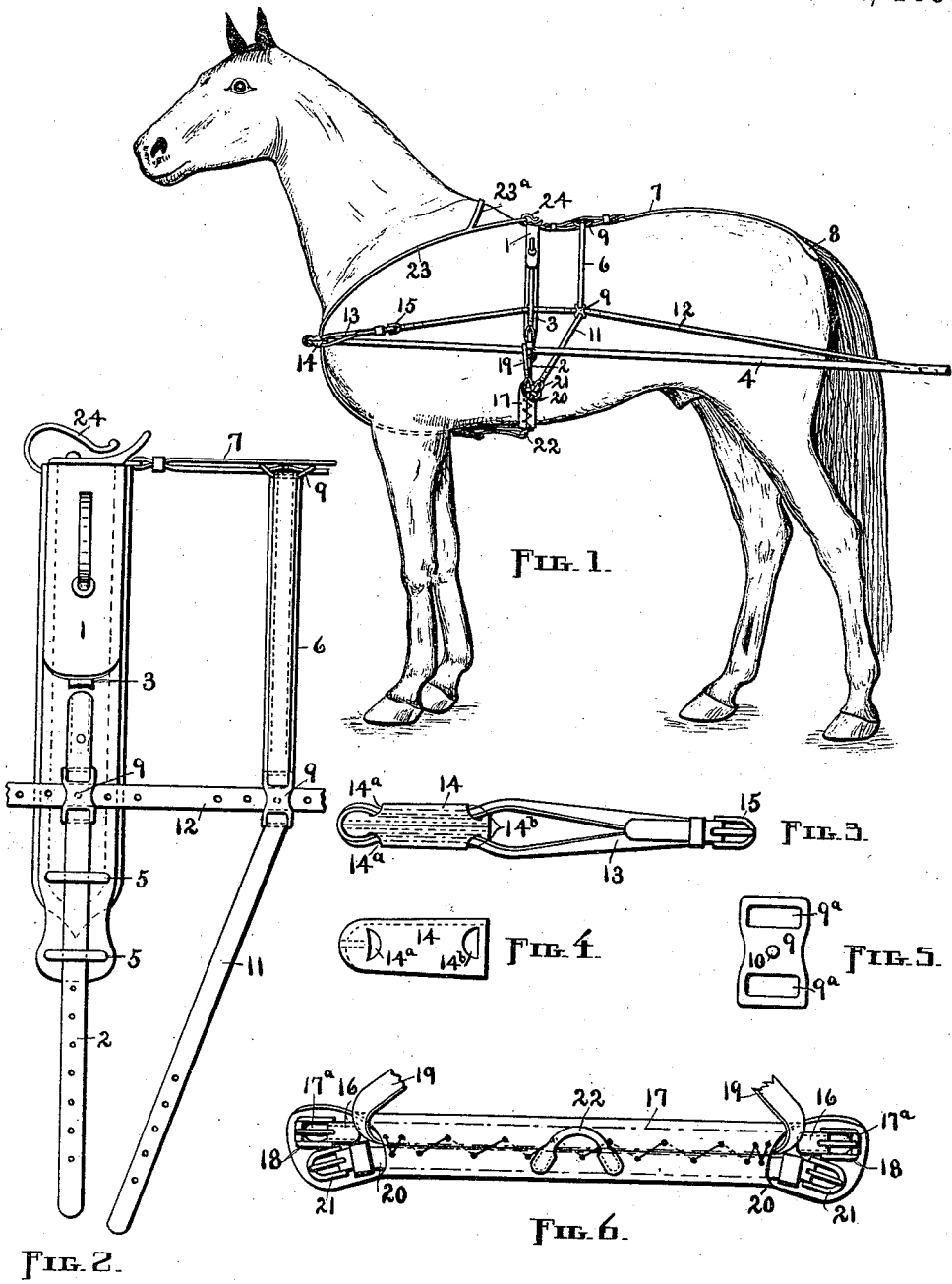
WITNESSES:
H. P. Bailey.
S. A. Stratton
INVENTOR:
C. A. Rahn,
by Burridge + Cutter,
attys.

UNITED STATES PATENT OFFICE.

CHARLES A. RAHN, OF CLEVELAND, OHIO.

HARNESS.

SPECIFICATION forming part of Letters Patent No. 532,906, dated January 22, 1895.

Application filed October 24, 1894. Serial No. 526,806. (No model.)

*To all whom it may concern:*

Be it known that I, CHARLES A. RAHN, a citizen of the United States, residing at Cleveland, in the county of Cuyahoga and State of Ohio, have invented certain new and useful Improvements in Harness, of which the following is a full, clear, and exact description.

My invention relates to improvements in harness, but more particularly to those used upon trotting horses, and consists of a peculiarly constructed saddle, belly-girt and thill-caps, a supplementary saddle, and connections, all as hereinafter fully described.

The object of my improvement is to provide an exceedingly light, simple, and pliable harness which will secure a horse to a vehicle with the least possible interference with the muscular movements of said horse. No breast-plate or collar is used with my harness and the ordinary breeching and traces are dispensed with.

That my invention may be seen and fully understood by others, reference will be had to the following specification and annexed drawings forming a part thereof, in which—

Figure 1 is a side view of my harness showing its application to a horse and vehicle; Fig. 2, an enlarged side view of the saddle and supplementary saddle; Fig. 3, an enlarged side view of the thill-cap and strap; Fig. 4, a bottom view of the same; Fig. 5, a bottom view of one of the adjusting buckles, and Fig. 6, a bottom view of the combined belly-girth and sheath.

Similar figures of reference designate like parts in the drawings and specification.

One side only of the harness is shown, but it will be understood that the opposite side is similar in every respect.

The saddle 1 has, upon each side, the strap 2 and the thill-tug 3, the latter receiving and supporting the forward end of the thill 4. In Fig. 2 the thill-tug 3 is broken away to show the strap 2 in full, and it will there be seen that said strap is secured only at its upper end to the saddle 1, leaving the lower part free to play up and down beneath the guides 5, 5.

The supplementary saddle 6 is attached at the top to the saddle 1 by the back-strap 7 which extends from said saddle 1 to the crupper 8. The adjusting buckle 9 enables the supplementary saddle 6 to be adjusted on the back-strap 7. The buckle 9, shown enlarged in Fig. 5, has the openings $9^a$, $9^a$ and the central tongue 10 rigidly attached thereto, but is too well known to need further description.

The strap 11 constitutes part of the supplementary saddle 6 and extends downward and forward, each side thereof. The saddle 1 and the supplementary saddle 6 are respectively provided on each side, with the buckle 9 which adjustably attaches the continuous strap 12 thereto. The strap 12 extends forward from the buckle 9, on the saddle 1, to the thill-cap strap 13 at the end of the thill 4, and backward from the buckle 9, on the supplementary saddle strap 11, to be attached to said thill, as shown, or it may be attached to the vehicle in any other suitable manner. Thus it will be seen that the straps 12, one on each side of the horse, serve both as breeching and traces. The straps 12 may be adjusted either vertically or laterally by means of the buckles 9 on the saddles 1 and 6, and it is for the purpose of rendering the accomplishment of this adjustment more easy that the straps 2 are attached to said saddle 1 so as to permit the same to play up and down.

The thill-cap 14, best shown in Figs. 3 and 4, is preferably made of leather and has in its upper and under sides the openings $14^a$ and $14^b$. The ends of the strap 13, before being united at the buckle 15, are passed through the openings $14^a$, into and through the cap 14, and emerge therefrom at the openings $14^b$. By using the caps 14 and the straps 13 over the ends of the thills, the strain of holding back the vehicle is distributed and does not pull out the stitches of the parts.

The tabs 16, 16 are stitched or otherwise secured to the inside of the combined belly-girth and sheath 17, at each end, and are provided with the buckles 18, 18 by which said sheath is attached to the straps 2. The combined belly-girth and sheath 17 is provided with the holes $17^a$, $17^a$ at each end to receive the ends of the straps 2. The sheath 17 is preferably laced together, as shown in Figs. 1 and 6, to permit of easy access to the interior thereof and not only serves as a pocket for the several straps therein, but keeps said straps from chafing the horse's belly. The strap 19 passes loosely through the sheath 17 and around each shaft 4 to hold down the same. The strap 20 having the buckle 21 at each end, lies loosely in the sheath 17 and the ends of the strap 11 are secured to said buckles. The loop 22 is attached to the under side of the sheath 17 and the martingale 23 is secured thereto, passes forward between the horse's fore-legs, and upward each side of the neck, as ordinarily, to the hook 24 on the saddle 1. The martingale 23 is provided with the neck-strap 23ª for the purpose of distributing the strain.

It will now be readily seen that the saddle 1 and combined belly-girth and sheath 17 with the strap connections between, and the supplementary saddle 6, straps 11 and 20, in conjunction with the back-strap 7, the straps 12, the caps 14 and straps 13, reinforced by the martingale 23 and the thill strap connections, form a light but extremely serviceable substitute for the ordinary harness.

The construction herein set forth embraces ready and accurate adjustment of all the parts and at the same time provides for the secure attachment of the several connecting parts, without trammeling the muscular action of the horse or his movements in relation to the thills.

What I claim as my invention, and desire to secure by Letters Patent, is—

1. The combination, in a harness, of a saddle provided with the straps 2 having adjusting buckles and secured to said saddle above the guides 5, a supplementary saddle strap back of said saddle and connected thereto by the back-strap and an adjusting buckle, said saddle strap extending downward and forward and having an adjusting buckle on each side, the continuous straps 12 adjustably secured to said straps 2 and said supplementary saddle strap by said buckles, a combined belly-girth and sheath buckling to said straps 2, and the straps 19 and 20 passing through said sheath, the latter buckling to said supplementary saddle strap, substantially as and for the purpose set forth.

2. The combination, in a harness, of a saddle provided with the straps 2 having adjusting buckles thereon and secured to said saddle above the guides 5, a supplementary saddle strap back of said saddle and connected therewith by the back-strap and an adjusting buckle, said saddle strap extending downward and forward and having an adjusting buckle on each side, the continuous straps 12 adjustably secured to said straps 2 and said supplementary saddle strap by said buckles, perforated thill-caps, straps connecting said caps with said straps 12, a combined belly-girth and sheath buckling to said straps 2, and the straps 19 and 20 passing through said sheath, the latter buckling to said supplementary saddle strap, substantially as and for the purpose set forth.

3. In combination with a harness, the cap 14 having perforations therein and the strap 13 passing into and out of said cap through said perforations, substantially as and for the purpose set forth.

4. In combination with a harness, a belly girth provided with a tab and buckle at each end, each end of said girth being provided with a hole, and the sides of the girth laced together to form a sheath for the reception of one or more supplemental straps, substantially as and for the purpose set forth.

In testimony whereof I affix my signature in presence of two witnesses.

CHAS. A. RAHN.

Witnesses:
F. A. CUTTER,
H. S. SPRAGUE.